United States Patent
Liang et al.

(10) Patent No.: US 11,973,215 B2
(45) Date of Patent: Apr. 30, 2024

(54) NEGATIVE ACTIVE MATERIAL, PREPARATION METHOD THEREOF, SECONDARY BATTERY AND RELATED BATTERY MODULE, BATTERY PACK AND DEVICE

(71) Applicant: Contemporary Amperex Technology Co., Limited, Ningde (CN)

(72) Inventors: Chengdu Liang, Ningde (CN); Yingjie Guan, Ningde (CN); Yuzhen Zhao, Ningde (CN); Yan Wen, Ningde (CN); Qisen Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 449 days.

(21) Appl. No.: 17/059,405

(22) PCT Filed: Jul. 14, 2020

(86) PCT No.: PCT/CN2020/101845
§ 371 (c)(1),
(2) Date: Nov. 27, 2020

(87) PCT Pub. No.: WO2021/017814
PCT Pub. Date: Feb. 4, 2021

(65) Prior Publication Data
US 2022/0140319 A1    May 5, 2022

(30) Foreign Application Priority Data
Jul. 29, 2019   (CN) .......................... 201910688061.4

(51) Int. Cl.
H01M 4/36       (2006.01)
H01M 4/04       (2006.01)
(Continued)

(52) U.S. Cl.
CPC ......... *H01M 4/366* (2013.01); *H01M 4/0404* (2013.01); *H01M 4/0471* (2013.01);
(Continued)

(58) Field of Classification Search
None
See application file for complete search history.

(56) References Cited

U.S. PATENT DOCUMENTS

2012/0034523 A1    2/2012   Sheem et al.
2014/0127516 A1    5/2014   Wang et al.
(Continued)

FOREIGN PATENT DOCUMENTS

CN    103688395 A    3/2014
CN    104022257 A    9/2014
(Continued)

OTHER PUBLICATIONS

The First Office Action for Chinese Application No. 201910688061. 4, dated Jul. 30, 2021, 8 pages.
(Continued)

*Primary Examiner* — Tracy M Dove
(74) *Attorney, Agent, or Firm* — East IP P.C.

(57) ABSTRACT

The present application discloses a negative active material, preparation process thereof and a secondary battery and the related battery module, battery pack and device. The negative active material comprises a core material and a modified polymer coating layer coated on at least a part of the outer surface of the core material, the core material comprises one or more of silicon-based materials and tin based materials, the coating layer comprises carbon element and nitrogen element, wherein the nitrogen element is present in the negative active material in a mass percentage of 0.1%~0.66%, and the coating layer comprises a —C=N-linkage.

16 Claims, 4 Drawing Sheets

(51) Int. Cl.
  *H01M 4/38* (2006.01)
  *H01M 4/587* (2010.01)
  *H01M 4/62* (2006.01)
  *H01M 4/02* (2006.01)

(52) U.S. Cl.
  CPC .......... *H01M 4/386* (2013.01); *H01M 4/387* (2013.01); *H01M 4/587* (2013.01); *H01M 4/625* (2013.01); *H01M 2004/021* (2013.01); *H01M 2004/027* (2013.01); *H01M 2220/20* (2013.01)

(56) References Cited

U.S. PATENT DOCUMENTS

| | | | |
|---|---|---|---|
| 2014/0127576 A1 | 5/2014 | Kato et al. |
| 2017/0170477 A1 | 6/2017 | Sakshaug et al. |

FOREIGN PATENT DOCUMENTS

| | | | |
|---|---|---|---|
| CN | 107204438 A | 9/2017 |
| CN | 107210431 A | 9/2017 |
| CN | 108475779 A | 8/2018 |
| CN | 109216669 A | 1/2019 |
| CN | 109728288 A | 5/2019 |
| CN | 109742369 A | 5/2019 |
| CN | 109786711 A | 5/2019 |
| CN | 110556519 A | 12/2019 |
| JP | 2012501951 A | 1/2012 |
| JP | 2014192064 A | 10/2014 |
| WO | 2013018486 A1 | 2/2013 |
| WO | 2018145765 A1 | 8/2018 |

OTHER PUBLICATIONS

The extended European search report for EP Application No. 20806919.5, dated Jul. 28, 2021, 10 pages.
The First Office Action for EP Application No. 20806919.5, dated Mar. 9, 2022, 5 pages.
The Second Office Action for Chinese Application No. 201910688061.4, dated Nov. 17, 2021, 7 pages.
The Third Office Action for Chinese Application No. 201910688061.4, dated Feb. 8, 2022, 7 pages.
The First Office Action for IN Application No. 202217003546, dated Jun. 15, 2022, 6 pages.
The First Office Action for JP Application No. 2022-505419, dated Feb. 22, 2023, 8 pages.
PCT International Search Report for PCT/CN2020/101845, dated Oct. 20, 2020, 12 pages.
The First Office Action for Korean Application No. 10-2022-7003590, dated Nov. 13, 2023, 13 pages.
Polymer Degradation and Stability 92 (2007) pp. 1421-1432(Apr. 14, 2007.), M.S.A. Rahaman et al., A review of heat treatment on polyacrylonitrile fiber, 12 pages.
ACS Appl. Mater. Interfaces 2016, 8, pp. 8154-8161(Mar. 15, 2016.), Lei Luo et al., Comprehensive Understanding of High Polar Polyacrylonitrile as an Effective Binder for Li-Ion Battery Nano-Si Anodes, 8 pages.

NEGATIVE ACTIVE MATERIAL, PREPARATION METHOD THEREOF, SECONDARY BATTERY AND RELATED BATTERY MODULE, BATTERY PACK AND DEVICE

CROSS-REFERENCE TO RELATED APPLICATION

This application is a National Stage of International Application No. PCT/CN2020/101845 filed on Jul. 14, 2020, which claims priority to Chinese Patent Application No. 201910688061.4 filed on Jul. 29, 2019, both of which are incorporated herein by reference in their entireties.

TECHNICAL FIELD

This application belongs to the technical field of energy storage devices, and specifically relates to a negative active material, preparation method thereof, a secondary battery and related battery module, battery pack and device.

BACKGROUND

In recent years, due to the higher energy density requirements of the electric vehicle industry, a lot of research has been carried out on high-capacity negative active materials. Among them, silicon-based materials and tin-based materials have a very high theoretical gram capacity, which is several times that of graphite materials, so they have received much attention. However, silicon-based materials and tin-based materials have serious volume effect, which leads to huge volume expansion during charge procedure, resulting in rapid capacity degradation and poor cycle performance of batteries.

SUMMARY

In a first aspect of the present application, a negative active material is provided, comprising a core material and a modified polymer coating layer coated on at least a part of the outer surface of the core material, the core material comprises one or more of silicon-based materials and tin based materials, the coating layer comprises carbon element and nitrogen element, wherein the nitrogen element is present in a mass percentage of 0.1%~0.66% based on the total mass of the negative active material, and the coating layer comprises a —C=N-linkage.

The negative active material provided by the application comprises a silicon-based/tin-based core material and a modified polymer coating layer coated on at least a part of the outer surface of the core material, in which the coating layer comprises a prescribed amount of nitrogen element and comprises a —C=N-linkage, which enables the coating layer to have good conductivity and high mechanical toughness both, and thus makes the negative active material have high electrical conductivity and cycle stability while having higher gram capacity. Therefore, the secondary battery with the negative active material has greatly improved cycle performance while having high energy density.

In any of the forgoing embodiments, the nitrogen element may be present in a mass percentage of 0.2%~0.56% based on total mass of the negative active material. The negative active material having a mass percentage of the nitrogen element within above range may further improve the cycle performance of batteries.

In any of the forgoing embodiments, the carbon element may be present in a mass percentage of 0.71%~3.40% based on total mass of the negative active material. Optionally, the carbon element may be present in a mass percentage of 1.15%~2.57% based on total mass of the negative active material. The negative active material having a mass percentage of the carbon element within above range enables the secondary batteries to have higher cycle performance and energy density.

In any of the forgoing embodiments, the negative active material has a Raman spectrum comprising scattering peaks at the Raman shifts of 1320 cm$^{-1}$~1410 cm$^{-1}$ and 1550 cm-1~1650 cm-1 in which the scattering peak at the Raman shifts of 1320 cm$^{-1}$~1410 cm$^{-1}$ has a peak intensity recorded as $I_D$, and the scattering peak at the Raman shifts of 1550 cm$^{-1}$~1650 cm$^{-1}$ has a peak intensity recorded as $I_G$, and the peak intensity $I_D$ and the peak intensity $I_G$ may satisfy $1.50 \leq I_D/I_G \leq 2.50$. Optionally, $1.80 \leq I_D/I_G \leq 2.40$. Using the negative active material may improve first coulomb efficiency, cycle performance and energy density of secondary batteries.

In any of the forgoing embodiments, the negative active material has an infrared spectrum comprising an infrared absorption peak at the wavenumber of 1350 cm$^{-1}$~1450 cm$^{-1}$, and the infrared absorption peak has a transmittance of 90%~98%, and optionally 92%~96%. When the negative active material has an infrared absorption peak at the wavenumber of 1350 cm$^{-1}$ to 1450 cm$^{-1}$, and the transmittance of the infrared absorption peak is within a given range, the first coulomb efficiency and cycle performance of secondary batteries may be further improved.

In any of the forgoing embodiments, the negative active material has a number particle size distribution $D_n10$ that satisfies 1.5 μm≤$D_n10$≤4.5 μm. Optionally, 2 μm≤$D_n10$≤4 μm. The negative active material having a $D_n10$ within the above ranges may further improve the cycle performance and energy density of secondary batteries.

In any of the forgoing embodiments, the negative active material has a specific surface area of 0.7 m$^2$/g~3 m$^2$/g, and optionally 0.9 m$^2$/g~2.2 m$^2$/g. The negative active material having a specific surface area within above range may further improve cycle performance of batteries while satisfying the requirements for the dynamic performance of secondary batteries.

In any of the forgoing embodiments, the negative active material has a volume particle size distribution $D_v50$ that may satisfy 3 μm≤$D_v50$≤10 μm. Optionally, 4 μm≤$D_v50$≤8 μM. The negative active material having a $D_v50$ within the above ranges may further improve the cycle performance and energy density of secondary batteries.

In any of the forgoing embodiments, the negative active material has an X-ray diffraction pattern comprising a diffraction peak at the diffraction angle 2 θ of 19° to 27° and the diffraction peak has a full width at half maxima of 4° to 12°, and optionally 5° to 10°. When the negative active material has a diffraction peak at the diffraction angle 2 θ of 19° to 27° and the diffraction peak has a full width at half maxima within a given range, the cycle performance of secondary batteries may be further improved.

In any of the forgoing embodiments, the negative active material may have a compaction density of 1.1 g/cm$^3$~1.72/cm$^3$ under the test condition of 5 tons (equivalent to 49 KN). Optionally, the negative active material may have a compaction density of 1.3 g/cm$^3$~1.5 g/cm$^3$ under the test condition of 5 tons (equivalent to 49 KN). The negative active material having a compaction density within above range is conductive to increasing the energy density of secondary batteries.

In a second aspect of the present application, a preparation process of a negative active material is provided, the preparation process comprising:

a) providing a core material comprising one or more of silicon-based materials and tin-based materials;
b) dispersing a polymer into a solvent to obtain a first slurry;
c) adding the core material to the first slurry, and mixing it homogeneously to obtain a second slurry;
d) drying the second slurry at 50° C.~200° C. to remove the solvent to obtain a polymer coated core material;
e) subjecting the polymer coated core material to heat treatment to carbonize the polymer, thereby obtaining the negative active material;

wherein the negative active material comprises the core material and a modified polymer coating layer coated on at least a part of the outer surface of the core material, the coating layer comprises carbon element and nitrogen element, wherein the nitrogen element is present in a mass percentage of 0.1%~0.66% based on the total mass of the negative active material, and the coating layer comprises a —C=N-linkage.

The negative active material obtained by the preparation process of a negative active material provided by the present application comprises a silicon-based/tin-based core material and a modified polymer coating layer coated on at least a part of the outer surface of the core material, in which the coating layer comprises a specific amount of nitrogen element and comprises a —C=N-linkage, which enables the coating layer to have good conductivity and high mechanical toughness both, and thus makes the negative active material have high electrical conductivity and cycle stability while having higher gram capacity. Therefore, the secondary battery with the negative active material has greatly improved cycle performance under the condition of having high energy density.

In any of the forgoing embodiments, in step b), the polymer is selected from one or more of polyaniline, polyimide, polyacrylonitrile and polyacrylamide. Using the polymer can make the coating layer have better toughness and conductivity, and can further improve the cycle performance of batteries.

In any of the forgoing embodiments, in step b), the polymer is added in an amount of less than or equal to 10% based on the mass of the solvent. In the first slurry, the polymer is added in a proper amount, which is beneficial to improve the particle size distribution of the negative active material, and to make the Dn10 and Dv50 of the negative active material within an appropriate range, thereby improving the energy density and cycle performance of batteries.

In any of the forgoing embodiments, in the step c), the mass of the polymer contained in the first slurry is 1%-5% of the mass of the core material. The relationship between the mass of the polymer contained in the first slurry and the mass of the core material added to the first slurry satisfies the above-mentioned relationship, so that the coating layer can fully coat the core material and improve the electron conductivity and cycle stability of the negative active material, while also ensuring that the negative active material has a higher gram capacity, thereby obtaining batteries having a higher cycle performance and energy density both.

In any of the forgoing embodiments, in the step c), the second slurry has a solid content of 20% or less. The second slurry has a solid content within the given range is beneficial to improve the particle size distribution of the negative active material, and to make the Dn10 and Dv50 of the negative active material within an appropriate range, thereby improving the energy density and cycle performance of batteries.

In any of the forgoing embodiments, in the step e), the heat treatment is carried out at a temperature of 250° C.~450° C., optionally 300° C.~450° C., further optionally 350° C.~450° C.; and/or the heat treatment is carried out for 2 h~8 h, and optionally 3 h~5 h. In the negative active material obtained by the heat treatment, the coating layer can have the required nitrogen content and also contain —C=N-linkage, so that the coating layer has higher toughness and further improved conductivity, thereby further improving the cycle performance of batteries.

In any of the forgoing embodiments, in the step b), the first slurry also comprises a conductive material. By using the first slurry, the coating layer of the obtained negative active material comprises a conductive material, thereby further improving the conductivity of the coating layer, and further improving the cycle performance of batteries.

Optionally, the conductive material is added to the first shiny in an amount of 10%-30% based on the mass of the polymer. In this way, the coating layer may have improved conductivity while having higher toughness so that the negative active material has higher electronic conductivity and cycle stability, thereby obtaining batteries having higher cycle performance.

Optionally, the conductive material is selected from one or more of conductive carbon black, carbon nanotubes and graphene.

In a third aspect of the present application, a secondary battery is provided, which comprises the negative active material according to the first aspect of the present application or the negative active material obtained by the preparation process according to the second aspect of the present application.

The secondary battery of the present application have long cycle performance and high energy density both since it adopts the negative active material of the present application.

In a fourth aspect of the present application, a battery module is provided, which comprises the secondary battery according to the third aspect of the present application.

In a fifth aspect of the present application, a battery pack is provided, which comprising the battery module according to the fourth aspect of the present application.

In a sixth aspect of the present application, a device is provided, which comprises at least one of the secondary battery according to the third aspect of the present application, the battery module according to the fourth aspect of the present application, or the battery pack according to the fifth aspect of the present application.

The battery module, battery pack and device of the present application comprise the secondary battery, thus having at least the same or similar technical effect as the secondary battery.

DETAILED DESCRIPTION

Figure 1:
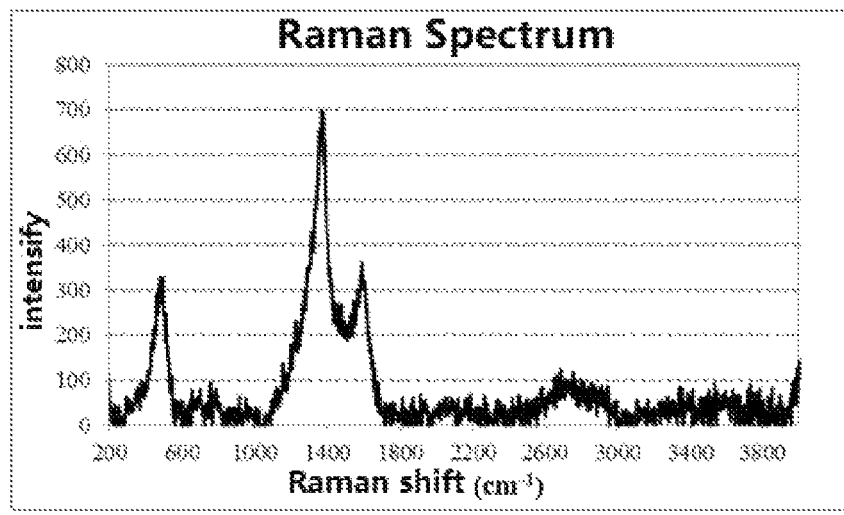
FIG. 1 is a Raman spectrum of a negative active material according to the present application.

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

In the description herein, it should be noted that, unless otherwise stated, the recitation of numerical ranges by "above" and "below" include all numbers within that range including the endpoints. As used herein, "a", "an", "the", "at least one", and "one or more" are used interchangeably, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Negative Active Material

In a first aspect of the present application, a negative active material is provided, comprising a core material and a modified polymer coating layer coated on at least a part of the outer surface of the core material, the core material comprises one or more of silicon-based materials and tin based materials, the coating layer comprises carbon element and nitrogen element, wherein the nitrogen element is present in the negative active material in a mass percentage of 0.1%~0.66%, and the coating layer comprises a —C=N-linkage.

In the negative active material of the present application, at least a part of the outer surface of the silicon-based material is coated with a modified polymer coating layer, which coating layer has good toughness and which can prevent the coating layer from cracking due to the expansion and contraction of the silicon-based material. The intact coating layer can effectively protect the silicon-based materials for a long time, inhibit the side reaction of electrolytic solution on the surface of the material, and also is conducive to the formation of stable SEI (solid electrolyte interphase) on the surface of the negative active material, so as to avoid the continuous consumption of electrolytic solution and active ions (such as lithium ion in lithium-ion secondary battery) due to the continuous breakage and repair of SEI film, thereby reducing the irreversible capacity of batteries and improving the cycle performance of secondary batteries.

Moreover, the coating layer comprises nitrogen element, in which the nitrogen element is present in the negative active material in a mass percentage of 0.1%~0.66% and the coating layer comprises —C=N-linkage. The coating layer comprises a certain amount of nitrogen and comprises —C=N-linkage, which makes the coating layer have high conductivity. The coating layer having high conductivity improves the electronic conductivity of the negative active material, which can improve the capacity and the capacity retention rate during the cycle of the negative active material and can also inhibit the impedance increase of secondary batteries during charge discharge cycle and reduce polarization of batteries. Therefore, the cycle performance of secondary batteries is further improved.

Therefore, the secondary battery with the negative active material according to the present application has long cycle performance and high energy density both.

In the negative active material of the present application, the mass percentage of the nitrogen element in the negative active material may be ≤0.66%, ≤0.62%, ≤0.6%, ≤0.56%, ≤0.54%, ≤0.5%, ≤0.48%, ≤0.45%, ≤0.4%, or ≤0.35%. The mass percentage of the nitrogen element in the negative active material may be ≥0.1%, ≥0.15%, ≥0.18%, ≥0.2%, ≥0.22%, ≥0.25%, ≥0.27%, or ≥0.3%.

Optionally, the mass percentage of the nitrogen element in the negative active material is 0.2%~0.56%. The negative active material having the mass percentage of the nitrogen element within above range may exert the above effect well and further improve the cycle performance of batteries.

In the negative active material of the present application, optionally, the mass percentage of the carbon element in the negative active material is 0.71%~3.40%, or 1.15%~2.57%.

The mass percentage of the carbon element in the negative active material is within above range, which is beneficial to make the coating layer have higher conductive performance and to enable the coating layer to have better elasticity and toughness and protect silicon oxide compounds well. Moreover, the mass percentage of the carbon element in the negative active material within above range is also conducive to making the negative active material have high gram capacity. Therefore, the mass percentage of the carbon element in the negative active material within the above range enables the secondary battery to have high cycle performance and energy density.

In some embodiments, in Raman scattering analysis, the negative active material has scattering peaks at the Raman shifts of 1320 $cm^{-1}$~1410 $cm^{-1}$ and 1550 cm-1~1650 cm-1 (FIG. 1) in which the scattering peak (abbreviated as peak D) at the Raman shifts of 1320 $cm^{-1}$~1410 $cm^{-1}$ has a peak intensity recorded as $I_D$, and the scattering peak (abbreviated as peak G) at the Raman shifts of 1550 $cm^{-1}$~1650 $cm^{-1}$ has a peak intensity recorded as $I_G$, and the $I_D$ and $I_G$ may satisfy $1.50 \leq I_D/I_G \leq 2.50$. Optionally, $1.80 \leq I_D/I_G \leq 2.40$.

The ratio of peak intensity $I_D$ of peak D to peak intensity $I_G$ of peak G within the above range can reduce the irreversible capacity of the material during charge and discharge cycles, and ensure that the coating layer has excellent conductivity, which is conducive to the capacity of the material and improve the cycle capacity retention rate, thereby improving the first coulomb efficiency, cycle performance and energy density of secondary batteries with the negative active materials.

Figure 2:
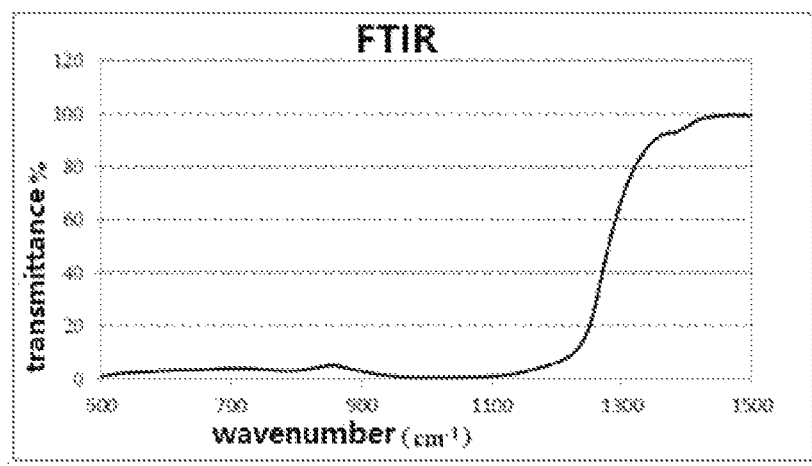
FIG. 2 is a infrared spectrum of a negative active material according to the present application.

In some embodiments, as shown in FIG. 2, the negative active material has an infrared spectrum comprising an infrared absorption peak at the wavenumber of 1350 cm$^{-1}$ to 1450 cm$^{-1}$, and the infrared absorption peak has a transmittance of 90%-98%. Optionally, the infrared absorption peak has a transmittance of 92%-96%. When the negative active material has an infrared absorption peak at the wavenumber of 1350 cm$^{-1}$ to 1450 cm$^{-1}$, and the infrared absorption peak has a transmittance within a given range, the negative active material may further improve the first coulomb efficiency and cycle performance.

In the negative active material of the present application, optionally, the modified polymer coating layer is a product obtained by partial carbonization of polymers. The product obtained by partial carbonization of polymers maintains the good toughness of the polymers and is not easy to break with the expansion and contraction of the core material.

Optionally, the polymer comprises one or more of polyaniline (abbreviated as PANI), polyimide (abbreviated as PI), polyacrylonitrile (abbreviated as PAN), and polyacrylamide (abbreviated as PAM). The coating layer obtained by partial carbonization of these polymers can have both better toughness and conductivity, thereby further improving battery performance.

Optionally, the partially carbonized polymer is obtained by heat treatment of the polymer at a specific temperature. The polymer-modified coating layer obtained by partial carbonization of polymers via heat treatment has higher overall performance, and the coating layer has both better toughness and conductivity, thereby further improving the performance of batteries.

Optionally, the partially carbonized polymer is obtained by heat treatment of the polymer at 250° C. to 450° C. Further optionally, the partially carbonized polymer is obtained by heat-treating the polymer at 300° C. to 450° C. Also optionally, the partially carbonized polymer is obtained by heat-treating the polymer at 350° C. to 450° C.

In the coating layer obtained by heat treatment of the polymer at 250° C.~450° C., the nitrogen content may satisfy the aforementioned requirements. In addition, the nitrogen element and carbon element in the coating layer form a carbon-nitrogen double bond, which further improves the conductivity of the coating layer. Moreover, the coating layer also maintains good toughness and is not prone to cracking. Therefore, the conductivity and mechanical toughness of the negative active material are improved, thereby improving the cycle performance of batteries.

In the negative active material of the present application, optionally, the coating layer is coated on 80% or more of the surface of the core material. If the coating layer is coated on the entire surface of the core material, the core material can be more fully protected.

In the negative active material of the present application, the core material comprises one or more of silicon-based materials and tin-based materials. Optionally, the silicon-based material is selected from one or more of elemental silicon, silicon-oxygen compounds, silicon-carbon composites, silicon-nitrogen compounds, and silicon alloys. Further optionally, the silicon-based material is selected from silicon-oxygen compounds. Optionally, the tin-based material can be selected from one or more of elemental tin, tin oxide compounds, and tin alloys.

Figure 3:
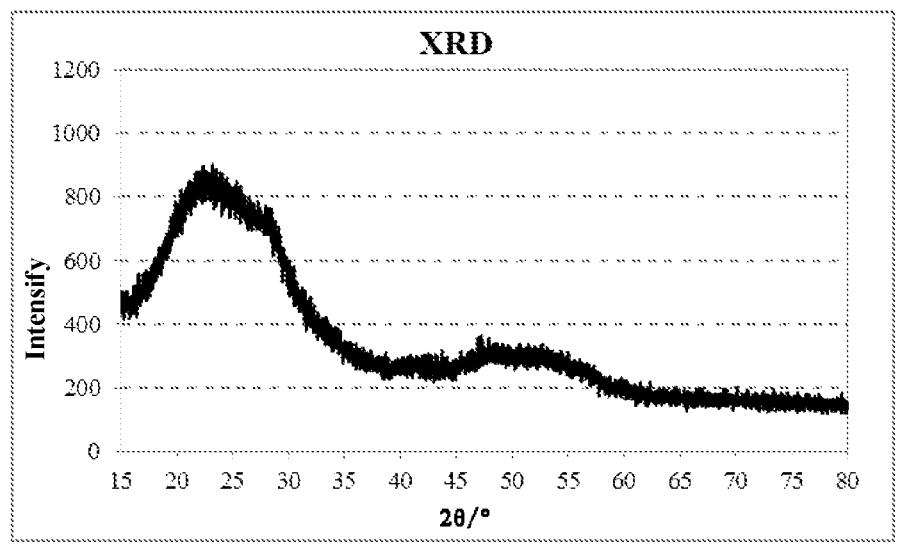
FIG. 3 is an X-ray diffraction (XRD) diagram of a negative active material according to the present application.

In some embodiments, optionally, in the X-ray diffraction analysis, the negative active material has a diffraction peak at a diffraction angle 2θ of 19°~27°, as shown in FIG. 3. The diffraction peak may has a full width at half maxima of 4°~12°. Optionally, the full width at half maxima of the diffraction peak is 5°-10°. Full width at half maxima, also known as FWHM, refers to the width of the peak at half the peak height.

The negative active material with a diffraction peak at 2θ of 19°~27° in which the diffraction peak has a full width at half maxima within the above range has a higher gram capacity and a lower cycle expansion effect, which is not prone to cracking and pulverization during charge and discharge cycles of secondary batteries, so the cycle life of batteries can be further improved.

In some embodiments, the negative active material of the present application has a number particle size distribution Dn10 that may satisfy 1 μm≤Dn10≤5 μm. Optionally, 1.5 μm≤Dn10≤4.5 μm. Further optionally, 2 μm≤Dn10≤4 μm. The negative active material comprises a certain proportion of small particle materials, which can reduce the rebound phenomenon of electrode plates, alleviate the expansion and deformation of electrode plates, and further improve the cycle performance of batteries. In addition, the number particle size distribution Dn10 of the negative active material is within the above range, which is also beneficial to increase the compaction density of the negative electrode film, and can reduce the side reaction of the negative electrode film, reduce the consumption of electrolytic solution, and improve the cycle performance and energy density of batteries.

In some embodiments, the negative active material of the present application has a volume particle size distribution Dv50 that may satisfy 2.5 μm≤Dv50≤12 μm. Optionally, 3 μm≤Dv50≤10 μm. Further optionally, 4 μm≤Dv50≤8 μm.

The volume particle size distribution Dv50 of the negative active material is within the above range, which can reduce the film-forming consumption of active ions on the negative electrode, and reduce the side reaction of electrolytic solution on the negative electrode, thereby reducing the irreversible capacity of secondary batteries; at the same time, which is also beneficial to obtain a higher active ions and electrons conductivity, and prevent particles from cracking or pulverizing during charge and discharge cycles, thereby further improving the cycle performance of secondary batteries. In addition, the Dv50 of the negative active material within the above range is also beneficial to reduce the amount of the binder added in the negative electrode, thereby increasing the energy density of batteries.

In some embodiments, the negative active material of the present application has a specific surface area that may be 0.5 m$^2$/g~4.5 m$^2$/g. Optionally, the specific surface area of the negative active material of the present application is 0.7 m$^2$/g–3 m$^2$/g. Further optionally, the specific surface area of the negative active material of the present application is 0.9 m$^2$/g to 2.2 m$^2$/g.

The specific surface area of the negative active material is within the above range, which can ensure that the surface of the material has more active sites, can improve the electrochemical performance of the material, and meet the requirements of secondary batteries to dynamic performance. In addition, the specific surface area of the negative active material within the above range is also beneficial to reduce side reactions of electrolytic solution on the negative electrode, and can reduce the film-forming consumption of active ions on the negative electrode, thereby improving the cycle performance of batteries.

In some embodiments, optionally, the negative active material of the present application has a compaction density of 1.1 g/cm$^3$ to 1.7 g/cm$^3$ under a pressure of 49 KN. Optionally, the negative active material of the present application has a compaction density of 1.3 g/cm$^3$~1.5 g/cm$^3$ wider a pressure of 49 KN. The compaction density of the negative active material is within the given range, which is beneficial to increase the energy density of secondary batteries.

In the present application, the negative active material can be analyzed by infrared spectroscopy using instruments and methods known in the art, such as an infrared spectrometer, such as the IS10 Fourier Transform Infrared Spectrometer from Nicolet, USA. The infrared spectrum of the negative active material of the present application can be tested in accordance with GB/T6040-2002 General rules for infrared spectrum analysis.

In present application, the Raman spectrum of the negative active material can be measured by instruments and methods known in the art. For example, a Raman spectrometer is used. As a specific example, LabRAM HR Evolution laser microscopic Raman spectrometer is used to perform Raman scattering analysis on the negative active material in which a solid-state laser with a wavenumber of 523 nm is used as the light source, the beam diameter is 1.2 µm, and the power is 1 mW; macro Raman test mode is used and CCD detector is used. The negative active material powder is pressed into a tablet, on which 3 points are randomly chosen for testing, and average three sets of measured values obtained.

In the present application, the X-ray diffraction spectrum of the negative active material can be measured by instruments and methods well known in the art. For example, an X-ray diffractometer is used to measure the X-ray diffraction spectrum in accordance with JIS K0131-1996 (General rules for X-ray diffractometric analysis). When Type Bruker D8 Discover X-ray diffractometer is used, CuK$_\alpha$ rays is used as the radiation source, the ray wavenumber is λ=1.5406 Å, the scanning angle range for 2θ is 15°~80°, and the scanning rate is 4°/min.

In the present application, the content of nitrogen element in the negative active material can be determined by instruments and methods known in the art. For example, an oxygen, nitrogen and hydrogen analyzer is used. As a specific example, for example, Vario ELIII element analyzer manufactured by Elementar, Germany is used. CHN mode is used in which furnace 1 is operated at a temperature of 950° C., furnace 2 is operated at a temperature of 500° C. and furnace 3 is operated at a temperature of 0° C., and the helium and oxygen pressure reducing valve is adjusted to He: 0.2 Mpa, O2: 0.25 MPa. A certain weight of powder is weight and loaded into a tin boat, and the air in the tin boat is removed. After that, the tin boat is purged with helium gas, and then is placed on the sample stage for testing.

In the present application, the content of carbon element in the negative active material can be determined by using instruments and methods known in the art. For example, HCS-140 type infrared carbon and sulfur analyzer from Shanghai Dekai Instrument Co., Ltd. is used for testing in accordance with the measurement method of GB/T 20123-2006/ISO 15350:2000, and the detection precision meets the standard of Metrological Verification Regulation JJG 395-1997.

In the present application, the particle size distributions, Dn10 and Dv50, of the negative active material have the meanings well known in the art, and can be measured with instruments and methods known in the art, for example, with a laser particle size analyzer, such as Mastersizer 3000 laser particle size analyzer from Malvern Instruments Co., Ltd., UK.

In the present application, the specific surface area of the negative active material has the meaning known in the art, and can be measured with instruments and methods known in the art. For example, the specific surface area may be measured with nitrogen adsorption specific surface area analysis with reference to GB/T 19587-2004 (Determination of the specific surface area of solids by gas adsorption using the BET method), and calculated by the BET (Brunauer Emmett Teller) method, in which the nitrogen adsorption specific surface area analysis can be carried out by a specific surface and pore size distribution analyzer of Type: Tri Star II 3020 from Micromeritics, USA.

In the present application, the compaction density of the negative active material can be measured with instruments and methods known in the art. For example, with reference to GB/T24533-2009 standard, it can be measured by an electronic pressure tester, such as UTM7305 electronic pressure tester. Accurately weigh about 1 g of the sample, add it to a mold with a bottom area of 1.327 cm$^2$, apply a pressure of 5 tons (corresponding to 49 KN) to the sample with a pressurizing device and keep it under this pressure for 30 seconds before releasing the pressure, and then measure the height of the sample. The compaction density of the material can be obtained by the following formula: ρ=m/(1.327*h), where p represents the compaction density of the material, m represents the mass of the sample, and h represents the height of the sample after being applied with a pressure of 5 tons and held at this pressure for 30 seconds before releasing the pressure.

Next, a process for preparing a negative active material is provided, by which the negative active material of the present application can be prepared.

As a specific example, the preparation method of the negative active material comprises the following steps:

S10: crushing a core material and obtaining the core material with a certain particle size distribution;

S20: dispersing a polymer in a solvent to figure out a polymer slurry 1 (i.e., a first slurry);

S30: adding the core material to the slurry 1 and mixing them homogeneously to obtain a slurry 2 (i.e., a second slurry);

S40: drying the slurry 2 at a temperature of 50° C. to 200° C. until the solvent is completely removed, thereby obtaining a polymer coated core material on the surface; and S50: heat-treating the polymer coated core material at a specific temperature to partially carbonize the polymer, and then sieving it to obtain the negative active material.

It should be noted that S10 is not an essential step, and the core material with the required particle size can also be commercially available.

In the above preparation method, the core material in step S10 may be one or more of the aforementioned silicon-based materials and tin-based materials.

In the above preparation method, the polymer in step S20 can be the aforementioned polymer, such as one or more of polyaniline (PANI), polyimide (PI), polyacrylonitrile (PAN) and polyacrylamide (PAM).

The solvent in step S20 can be selected from one or more of water, acetone, N-methyl pyrrolidone (abbreviated as NMP), N,N-Dimethylformamide (abbreviated as DMF), and ethanol.

In slurry 1, optionally, the mass of the polymer is 1% to 5% of the mass of the core material.

Optionally, a certain amount of conductive material can be added to the slurry 1. Adding a conductive material to the coating layer of the negative active material can further improve the conductivity of the negative active material.

The conductive material can be selected from one or more of conductive carbon black, carbon nanotubes and graphene. Optionally, the added amount of the conductive material accounts for 10%-30% of the polymer mass.

In the above preparation method, the specific heat treatment temperature in step S50 is preferably 250° C. to 450° C., and controlling the temperature within this range can avoid complete carbonization of the polymer and control the nitrogen content within the given range.

Optionally, the heat treatment time is 2 h-8 h, more preferably 3 h-5 h.

In the above preparation method, the following process conditions have an effect on the particle size distribution Dn0 and Dv50 of the negative active material:
(1) The particle size distribution of the core material after the pulverization process in step S10.
(2) The amount of polymer added in slurry 1. Optionally, the amount of polymer added is less than or equal to 10% of the mass of the solvent. Optionally, the amount of polymer added is 0.05%~10%, 0.1~10%, 0.1%~5%, 0.1%~3%, 0.1%~1%, 0.1%~0.6%, 0.2%~1%, 0.3%~0.55%, or 0.1%~0.5% of the solvent mass.
(3) The solid content of slurry 2. Optionally, the solid content of slurry 2 is 20% or less. Optionally, the solid content of slurry 2 is 5%~20%, 5%~15%, 8%~15%, 9%~13%, or 10%~15%.

By adjusting one or more of the above process conditions, the negative active material prepared by the above preparation method can satisfy the particle size distribution described above.

In the above preparation method, an inert atmosphere can be used for protection if necessary. For example, the inert atmosphere can be selected from one or more of nitrogen, argon, and helium.

Secondary Battery

The second aspect of the present application provides a secondary battery comprising the negative active material according to the first aspect of the present application.

Specifically, the secondary battery comprises a positive electrode plate, a negative electrode plate, a separator, and an electrolyte. The negative electrode comprises a negative current collector and a negative electrode film disposed on at least one surface of the negative current collector, wherein the negative electrode film comprises the negative active material according to the first aspect of the present application.

In the secondary battery of the present application, the negative electrode current collector can be made of a material with good conductivity and mechanical strength, preferably copper foil.

In the secondary battery of the present application, furthermore, the negative electrode film may optionally comprise other negative active materials useful for the secondary batteries. Other negative active materials are preferably one or more of graphite, mesophase carbon microspheres (MCMB), hard carbon, and soft carbon, more preferably graphite. The graphite can be selected from one or more of artificial graphite and natural graphite.

In the secondary battery of the present application, furthermore, the negative electrode film may optionally comprise a conductive agent, a binder, and a thickener, and there is no specific limitation on their types, and those skilled in the art can make selections according to actual needs.

Optionally, the conductive agent used for the negative electrode film can be one or more of graphite, superconducting carbon, acetylene black, carbon black, Ketjen black, carbon dots, carbon nanotubes, graphene, and carbon nanofibers. The binder can be one or more of polyacrylic acid (PAA), sodium polyacrylate (PAAS), polyvinyl alcohol (PVA), styrene butadiene rubber (SBR), carboxymethyl cellulose (CMC), sodium alginate (SA), polymethacrylic acid (PMAA) and carboxymethyl chitosan (CMCS). The thickener can be sodium carboxymethyl cellulose (CMC-Na).

The negative electrode plate can be prepared according to conventional methods in the art. For example, the negative active material and optional conductive agent, binder and thickener are dispersed in a solvent which can be deionized water to form a uniform negative electrode slung. The negative electrode slurry is coated on the negative electrode current collector. After being dried, cold pressed and other processes, a negative electrode plate is obtained.

In the secondary battery of the present application, the positive electrode plate comprises a positive electrode current collector and a positive electrode film disposed on at least one surface of the positive electrode current collector and comprising a positive active material.

In the secondary battery of the present application, the positive electrode current collector can be made of materials with good electrical conductivity and mechanical strength, preferably aluminum foil.

In the secondary battery of the present application, the type of the positive active material is not specifically limited, and materials useful for the secondary battery and known in the art can be used, and those skilled in the art can make selections according to actual needs.

It should be noted that the secondary battery of the present application may be a lithium ion battery, a sodium ion battery or any other battery using the negative active material described according to the first aspect of the present application.

When the secondary battery of the present application is a lithium ion battery, optionally, the positive active material may be selected from lithium transition metal oxides and modified materials thereof, and the modified material may be lithium transition metal oxide subjected to doping modification and/or coating modification. Optionally, the lithium transition metal oxide can be selected from one or more of lithium cobalt oxide, lithium nickel oxide, lithium manganese oxide, lithium nickel manganese oxide, lithium nickel cobalt manganese oxide, lithium nickel cobalt aluminum oxide and lithium containing phosphate with olivine structure.

For example, the positive active material of the lithium ion battery can be selected from one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$(LFP) and $LiMnPO_4$.

When the secondary battery of the present application is a sodium ion battery, optionally, the positive active material can be selected from transition metal oxide $Na_xMO_2$ (M is a transition metal, preferably from one or more of Mn, Fe, Ni, Co, V, Cu, and Cr, $0<x\leq 1$), polyanionic materials (such as phosphate, fluorophosphate, pyrophosphate, sulfate), Prussian blue materials, and the like. However, the present application is not limited to these materials, other materials that can be used as a positive active material for sodium ion batteries can also be used. These positive electrode active materials may be used alone or in combination of two or more.

Optionally, the positive active material of the sodium ion battery can be selected from one or more of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaMnPO_4$, $NaCoPO_4$, Prussian blue materials, and materials with the general formula $A_aM_b(PO_4)_cO_xY_{3-x}$ where A is selected from one or more of $H^+$, $Li^+$, $Na^+$, $K^+$ and $NH_4^+$, and M is a transition metal cation, preferably one or more of V, Ti, Mn, Fe, Co, Ni, Cu and Zn, Y is a halogen anion, preferably one or more of F, Cl and Br, $0<a\leq 4$, $0<b\leq 2$, $1\leq c\leq 3$, $0\leq x\leq 2$.

In the secondary battery of the present application, furthermore, the positive electrode film may also comprise a binder and/or a conductive agent. The types of the binder and the conductive agent are not specifically limited, and those skilled in the art can make selections according to actual needs. Optionally, the binder used for the positive electrode film may comprise one or more of polyvinylidene fluoride (PVDF) and polytetrafluoroethylene (PTFE); the conductive agent may comprise one or more of graphite, superconducting carbon, acetylene black, carbon black, Ketjen black, carbon dots, carbon nanotubes, graphene, and carbon nanofibers.

The above-mentioned positive electrode plate can be prepared according to conventional methods in the art. For example, the positive active material and optionally conductive agent and binder are dispersed in a solvent (such as N-methylpyrrolidone, or NMP for short), to form a uniform positive electrode slurry, and the positive electrode slurry is coated on the positive electrode current collector. After being dried, cold pressed and other processes, the positive electrode plate is obtained.

In the secondary battery of the present application, there is no specific limitation on the type of electrolyte, and it can be selected according to requirements. The electrolyte may be selected from at least one of solid electrolyte and liquid electrolyte (i.e. an electrolytic solution). When the electrolyte is an electrolytic solution, the electrolytic solution comprises an electrolyte salt and a solvent. Among them, there is no particular limitation to the specific types of electrolyte salt and solvent, which can be selected according to actual needs.

When the secondary battery of the present application is a lithium ion battery, optionally, the electrolyte salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate) and LiTFOP (lithium tetrafluorooxalate phosphate).

When the secondary battery of the present application is a sodium ion battery, optionally, the electrolyte salt may be selected from one or more of $NaPF_6$, $NaClO_4$, $NaBCl_4$, $NaSO_3CF_3$ and $Na(CH_3)C_6H_4SO_3$.

In the secondary battery of the present application, optionally, the solvent may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

The electrolytic solution may optionally comprise an additive. The additive is not particularly limited and can be selected according to requirements. For example, the additives may comprise one or more of negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

In the secondary battery of the present application, the separator is disposed between the positive electrode plate and the negative electrode plate to isolate them. The separator is not particularly limited, and any well-known porous structure separator having chemical stability and mechanical stability can be selected, such as one or more of glass fiber, non-woven fabric, polyethylene, polypropylene and polyvinylidene fluoride. The separator can be a single-layer film or a multilayer composite film. When the separator is a multilayer composite film, the materials of each layer may be the same or different.

The secondary battery can be prepared by a method commonly known in the art. As an example, a positive electrode plate, a separator, and a negative electrode plate are wound (or stacked) in order, so that the separator is located between the positive electrode plate and the negative electrode plate to act as isolation, thereby obtaining an electrode component. The electrode component is placed in a packaging case, and then an electrolytic solution is injected therein and sealed to obtain a secondary battery.

Figure 4:
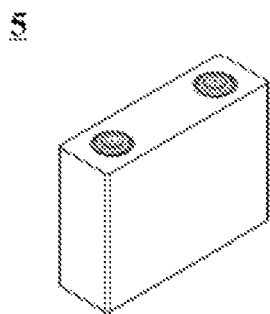
FIG. 4 is a perspective view of a secondary battery according to an embodiment of the present application.

The present application has no particular limitation on the shape of the secondary battery, which may be cylindrical, square or any other shapes. FIG. 4 shows a secondary battery 5 with a square structure as an example.

In some embodiments, the secondary battery may comprise an outer package. The outer packaging is used to package the positive electrode plate, the negative electrode plate and the electrolyte.

Figure 5:
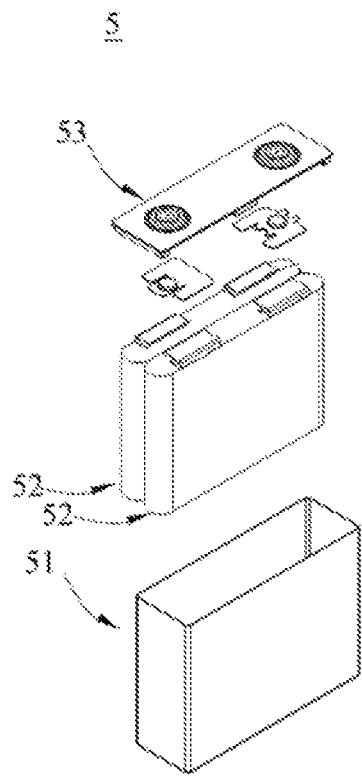
FIG. 5 is an exploded view of FIG. 4.

In some embodiments, referring to FIG. 5, the outer package may comprise a housing 51 and a cover 53, wherein the housing 51 may comprise a bottom plate and a side plate connected to the bottom plate, and the bottom plate and the side plate enclose a receiving cavity. The housing 51 has an opening communicating with the receiving cavity, and the cover plate 53 can cover the opening to close the receiving cavity.

A positive electrode plate, a negative electrode plate and a separator may be formed into an electrode assembly 52 through a winding process or a lamination process. The electrode assembly 52 is packaged in the receiving cavity. The electrolyte which can be an electrolytic solution is infiltrated in the electrode assembly 52. The number of electrode assemblies 52 contained in the secondary battery 5 can be one or more, which can be adjusted according to requirements.

In some embodiments, the outer packaging of the secondary battery may be a hard case, such as a hard plastic case, an aluminum case, a steel case. The outer packaging of the secondary battery may also be a soft bag, such as a pouch type soft bag. The material of the soft bag can be plastic, for example, it can comprise one or more of polypropylene (PR), polybutylene terephthalate (PBT), polybutylene succinate (PBS).

In some embodiments, the secondary battery can be assembled to form a battery module. The number of secondary batteries contained in the battery module can be multiple, and the specific number can be adjusted according to the application and capacity of the battery module.

Figure 6:
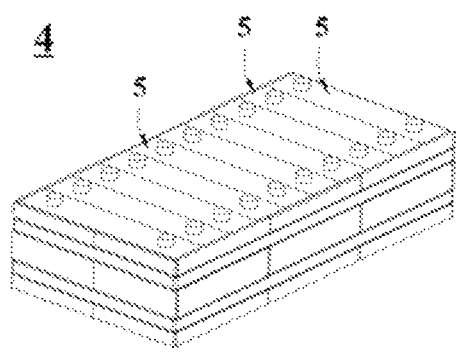
FIG. 6 is a perspective view of a battery module according to an embodiment of the present application.

FIG. 6 is a battery module 4 as an example. Referring to FIG. 6, in the battery module 4, a plurality of secondary batteries 5 may be arranged in sequence along the length direction of the battery module 4. Of course, it can also be arranged in any other manner. Further, the plurality of secondary batteries 5 can be fixed by fasteners.

Optionally, the battery module 4 may further comprise a housing with a receiving space, and a plurality of secondary batteries 5 are accommodated in the receiving space.

In some embodiments, the above-mentioned battery module can further be assembled into a battery pack. The number of battery modules contained in the battery pack can be adjusted according to the application and capacity of the battery pack.

Figure 7:
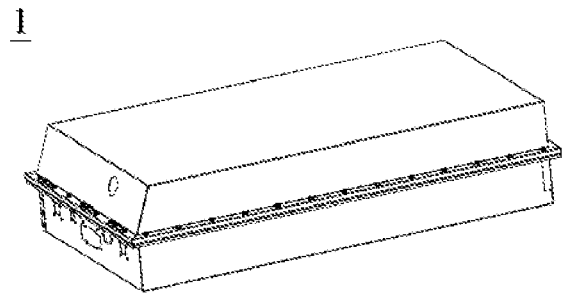
FIG. 7 is a perspective view of a battery pack according to an embodiment of the present application.
Figure 8:
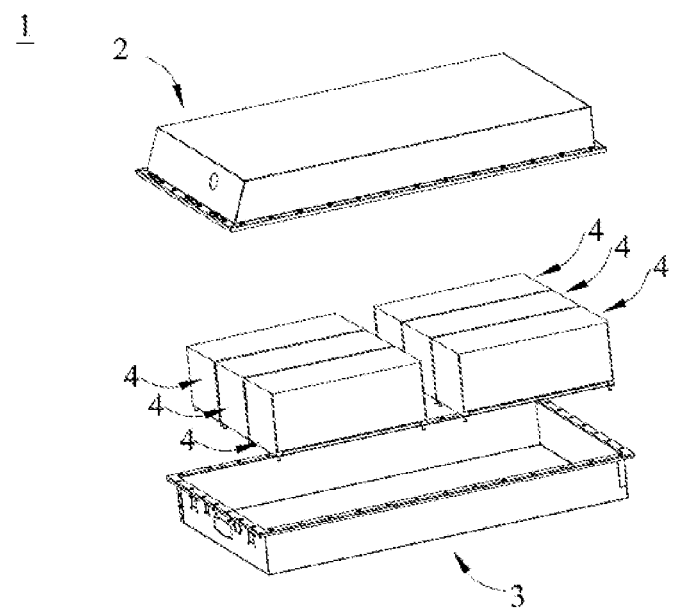
FIG. 8 is an exploded view of FIG. 7.

FIGS. 7 and 8 are the battery pack 1 as an example. Referring to FIGS. 7 and 8, the battery pack 1 may comprise a battery case and a plurality of battery modules 4 provided in the battery case. The battery case includes an upper case 2 and a lower case 3. The upper case 2 can be covered on the lower case 3 and forms a closed space for accommodating the battery module 4. Multiple battery modules 4 can be arranged in the battery box in any manner.

Device

The present application further provides a device comprising at least one of the secondary battery, battery module, or battery pack of the present application. The secondary battery, battery module or battery pack can be used as a power source of the device, and can also be used as an energy storage unit of the device. The device can be, but is not limited to, mobile devices (such as mobile phones, notebook computers), electric vehicles (such as pure electric vehicles, hybrid electric vehicles, plug-in hybrid electric vehicles, electric bicycles, electric scooters, electric golf carts, electric trucks.), electric trains, ships and satellites, energy storage systems, etc.

The device can be selected as a secondary battery, a battery module, or a battery pack according to its usage requirements.

Figure 9:
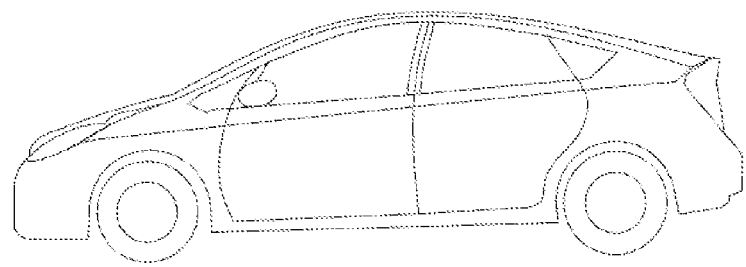
FIG. 9 is a schematic view showing a device with a secondary battery as a power source according to an embodiment of the present application.

FIG. 9 is a device as an example. The device is a pure electric vehicle, a hybrid electric vehicle, or a plug-in hybrid electric vehicle. In order to meet the requirements of the device for high power and high energy density of the secondary battery, a battery pack or a battery module can be used.

As another example, the device may be a mobile phone, a tablet computer, a notebook computer, etc. The device is generally required to be thin and light, and a secondary battery can be used as a power source.

EXAMPLES

The following examples are intended to describe the disclosure of the present application in more detail for only illustrative purpose, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

Example 1

Preparation of Negative Active Material

Silicon monoxide (SiO) powder was crushed to obtain SiO with a certain particle size distribution.

3 g of polyacrylonitrile (PAN) was dispersed into a solvent of 1000 mL of dimethylformamide (DMF) to prepare a polymer slurry 1.

100 g of pulverized SiO was added to slurry 1 and mixed homogeneously to obtain a slurry 2.

The slurry 2 was dried in an argon atmosphere at 190° C. for 2 hours until the solvent was completely removed, thereby obtaining SiO coated with PAN.

The PAN coated SiO was heat-treated in an argon atmosphere at 450° C. for 3 h, and then sieved to obtain a negative active material.

Preparation of Button Battery

The resulting silicon-oxygen compound, a conductive agent Super-P (conductive carbon black), a conductive agent CNT (carbon nanotube) and a binder PAA (polyacrylic acid) were mixed at a mass ratio of 85:4.5:0.5:10 in an appropriate amount of deionized water to obtain a homogeneous negative electrode slurry; the negative electrode slurry was coated on the surface of the negative electrode current collector copper foil, following by drying, cold pressing and cutting, thereby obtaining a negative electrode plate, which can be used as a negative electrode plate of a secondary battery.

A lithium metal plate was used as an electrode, Celgard 2400 separator was used, and electrolytic solution was injected to assemble a button battery. In the electrolytic solution, ethylene carbonate (EC), ethyl methyl carbonate (EMC), and diethyl carbonate (DEC) were mixed uniformly in a volume ratio of 1:1:1 to obtain an organic solvent, and then LiPF6 was dissolved in the above organic solvent. Then the additive fluoroethylene carbonate (FEC) was add, where the concentration of $LiPF_6$ was 1 mol/L, and the mass ratio of FEC in the electrolyte was 10%.

Examples 2 to 28 and Comparative Examples 1 to 3

Examples 2 to 28 and Comparative Examples 1 to 3 were the same as Example 1 with the exception that the relevant parameters in the preparation steps of the negative active material were adjusted to obtain different negative active materials. The preparation parameters that were different from those in Example 1 were shown in Table 1.

Measurement

1. The negative active material was tested using the test method described above.
2. Test for cycle performance of button battery Under a normal pressure environment at 25° C., a button battery was discharged at a constant current rate of 0.1 C to 0.005V, and then discharged at a constant current of 0.04 C to 0.005V. The resulting discharge capacity was recorded as the lithiation capacity after the first cycle. After that, the battery was charged to 1.5V at a constant current rate of 0.1

C. The resulting charge capacity was recorded as the delithiation capacity after the first cycle. The button battery was subjected to 50 charge and discharge cycles following the procedure described above, and the delithiation capacity for each cycle was recorded.

Cycle capacity retention rate (%) = delithiation capacity after the $50^{th}$ cycle/the lithiation capacity after the $1^{st}$ cycle × 100%

TABLE 1

Relevant preparation parameters for the negative active material

| | Polymer | | Heat-treatment | |
|---|---|---|---|---|
| No. | Type | Mass (g) | Temperature(° C.) | Time (h) |
| Ex 1 | Polyacrylonitrile | 3 | 450 | 3 |
| Ex 2 | Polyacrylonitrile | 3 | 420 | 3 |
| Ex 3 | Polyacrylonitrile | 3 | 400 | 3 |
| Ex 4 | Polyacrylonitrile | 3 | 380 | 3 |
| Ex 5 | Polyacrylonitrile | 3 | 350 | 3 |
| Ex 6 | Polyacrylonitrile | 3 | 300 | 3 |
| Ex 7 | Polyacrylonitrile | 3 | 250 | 3 |
| Ex 8 | Polyacrylonitrile | 1 | 400 | 3 |
| Ex 9 | Polyacrylonitrile | 2 | 400 | 3 |
| Ex 10 | Polyacrylonitrile | 4 | 400 | 3 |
| Ex 11 | Polyacrylonitrile | 5 | 400 | 3 |

TABLE 1-continued

Relevant preparation parameters for the negative active material

| | Polymer | | Heat-treatment | |
|---|---|---|---|---|
| No. | Type | Mass (g) | Temperature(° C.) | Time (h) |
| Ex 12 | Polyaniline | 3 | 400 | 3 |
| Ex 13 | Polyamide | 3 | 400 | 3 |
| Ex 14 | Polyimide | 3 | 400 | 3 |
| Ex 15 | Polyacrylonitrile | 3 | 400 | 3 |
| Ex 16 | Polyacrylonitrile | 3 | 400 | 3 |
| Ex 17 | Polyacrylonitrile | 3 | 400 | 3 |
| Ex 18 | Polyacrylonitrile | 3 | 400 | 3 |
| Ex 19 | Polyacrylonitrile | 3 | 400 | 3 |
| Ex 20 | Polyacrylonitrile | 3 | 400 | 3 |
| Ex 21 | Polyacrylonitrile | 3 | 400 | 3 |
| Ex 22 | Polyacrylonitrile | 3 | 400 | 3 |
| Ex 23 | Polyacrylonitrile | 3 | 400 | 3 |
| Ex 24 | Polyacrylonitrile | 3 | 400 | 3 |
| Ex 25 | Polyacrylonitrile | 3 | 400 | 3 |
| Ex 26 | Polyacrylonitrile | 3 | 400 | 3 |
| Ex 27 | Polyacrylonitrile | 3 | 400 | 3 |
| Ex 28 | Polyacrylonitrile | 3 | 400 | 3 |
| CEx 1 | Polyacrylonitrile | 3 | 1200 | 3 |
| CEx 2 | Polyacrylonitrile | 3 | 200 | 3 |
| CEx 3 | Polyacrylonitrile | 3 | / | / |

TABLE 2

Measurement results

| No. | Does it contain —C≡N-linkage | N content (%) | C content (%) | $I_D/I_G$ | $D_n10$ (μm) | $D_v50$ (μm) | Specific surface area (m²/g) | Cycle capacity retention rate after 50 cycles (%) |
|---|---|---|---|---|---|---|---|---|
| Ex 1 | Yes | 0.10 | 1.71 | 1.52 | 3.2 | 5.5 | 1.3 | 86.1 |
| Ex 2 | Yes | 0.15 | 1.72 | 1.67 | 3.2 | 5.5 | 1.3 | 89.3 |
| Ex 3 | Yes | 0.20 | 1.73 | 1.86 | 3.2 | 5.5 | 1.3 | 96.3 |
| Ex 4 | Yes | 0.32 | 1.75 | 2.05 | 3.2 | 5.5 | 1.3 | 96.7 |
| Ex 5 | Yes | 0.56 | 1.76 | 2.33 | 3.2 | 5.5 | 1.3 | 96.4 |
| Ex 6 | Yes | 0.62 | 1.77 | 2.44 | 3.2 | 5.5 | 1.3 | 91.2 |
| Ex 7 | Yes | 0.66 | 1.78 | 2.48 | 3.2 | 5.5 | 1.3 | 85.8 |
| Ex 8 | Yes | 0.13 | 0.71 | 1.82 | 3.2 | 5.5 | 1.3 | 90.5 |
| Ex 9 | Yes | 0.21 | 1.15 | 2.01 | 3.2 | 5.5 | 1.3 | 95.1 |
| Ex 10 | Yes | 0.47 | 2.57 | 2.03 | 3.2 | 5.5 | 1.3 | 95.4 |
| Ex 11 | Yes | 0.62 | 3.39 | 2.02 | 3.2 | 5.5 | 1.3 | 90.6 |
| Ex 12 | Yes | 0.27 | 1.7 | 1.95 | 3.2 | 5.5 | 1.3 | 91.3 |
| Ex 13 | Yes | 0.30 | 1.67 | 2.18 | 3.2 | 5.5 | 1.3 | 91.2 |
| Ex 14 | Yes | 0.16 | 1.69 | 2.16 | 3.2 | 5.5 | 1.3 | 89.7 |
| Ex 15 | Yes | 0.35 | 1.92 | 2.03 | 1.0 | 5.5 | 2.2 | 88.0 |
| Ex 16 | Yes | 0.34 | 1.86 | 2.05 | 1.5 | 5.5 | 1.8 | 93.1 |
| Ex 17 | Yes | 0.33 | 1.81 | 2.02 | 2.0 | 5.5 | 1.6 | 95.2 |
| Ex 18 | Yes | 0.32 | 1.75 | 2.08 | 2.7 | 5.5 | 1.4 | 95.9 |
| Ex 19 | Yes | 0.31 | 1.7 | 2.04 | 4.0 | 5.5 | 1.2 | 95.3 |
| Ex 20 | Yes | 0.30 | 1.64 | 2.07 | 4.5 | 6 | 1.1 | 93.1 |
| Ex 21 | Yes | 0.28 | 1.53 | 2.06 | 5.0 | 8 | 0.8 | 89.0 |
| Ex 22 | Yes | 0.35 | 1.92 | 2.09 | 1.5 | 2.5 | 4.5 | 88.1 |
| Ex 23 | Yes | 0.34 | 1.86 | 2.01 | 1.5 | 3 | 3 | 92.1 |
| Ex 24 | Yes | 0.33 | 1.81 | 2.04 | 2.3 | 4 | 2.2 | 95.6 |
| Ex 25 | Yes | 0.31 | 1.7 | 2.05 | 3.3 | 7 | 1.1 | 94.9 |
| Ex 26 | Yes | 0.30 | 1.64 | 2.09 | 3.5 | 8 | 0.9 | 94.9 |
| Ex 27 | Yes | 0.28 | 1.53 | 2.06 | 4.0 | 10 | 0.7 | 92.0 |
| Ex 28 | Yes | 0.26 | 1.42 | 2.08 | 5.0 | 12 | 0.5 | 88.0 |
| CEx 1 | No | 0 | 1.69 | 1.34 | 3.2 | 5.5 | 1.3 | 73.4 |
| CEx 2 | Yes | 0.68 | 1.79 | / | 3.2 | 5.5 | 1.3 | 77.2 |
| CEx 3 | No | 0.7 | 1.8 | / | 3.2 | 5.5 | 1.3 | 65.5 |

In Table 2, N content refers to the mass percentage of nitrogen element in the negative active material; C content refers to the mass percentage of carbon element in the negative active material; and "/" means that the material does not contain the scattering peak.

It was shown from the data in Table 2 that the negative active material of the present application comprised a silicon-based core material and a modified polymer coating layer covering at least a part of the outer surface of the core material, and the coating layer contained a prescribed amount of nitrogen element and contained the —C=N— linkage, which significantly improved the cycle life of the negative active material, and thus the cycle performance of the secondary battery could be greatly improved.

In Comparative Examples 1 to 3, too high or too low nitrogen content in the coating layer will affect the cycle life of the negative active material, resulting in poor cycle performance of the secondary battery.

Using the negative active material of the present application enabled the secondary battery to have both higher energy density and cycle performance.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

The invention claimed is:

1. A negative active material comprising a core material and a modified polymer coating layer coated on at least a part of an outer surface of the core material, the core material comprises silicon-based materials, the modified polymer coating layer comprises carbon element and nitrogen element,
   wherein the nitrogen element is present in a mass percentage of 0.2%-0.56% based on a total mass of the negative active material, the carbon element is present in a mass percentage of 1.7%-3.40% based on the total mass of the negative active material, and the modified polymer coating layer comprises a —C=N-linkage;
   wherein the negative active material has a number particle size distribution $D_n10$ that satisfies 2 μm≤$D_n10$≤4 μm; and
   wherein the negative active material has a Raman spectrum comprising scattering peaks at Raman shifts of 1320 cm$^{-1}$-1410 cm$^{-1}$ and 1550 cm-1-1650 cm-1 in which the scattering peak at the Raman shifts of 1320 cm$^{-1}$-1410 cm$^{-1}$ has a peak intensity recorded as $I_D$, and the scattering peak at the Raman shifts of 1550 cm$^{-1}$-1650 cm$^{-1}$ has a peak intensity recorded as $I_G$, and the peak intensity $I_D$ and the peak intensity $I_G$ satisfy 1.50≤$I_D/I_G$≤2.50; and
   wherein the negative active material has a specific surface area of 1.2 m$^2$/g-3 m$^2$/g.

2. The negative active material according to claim 1, wherein
   the negative active material has an infrared spectrum comprising an infrared absorption peak at a wavenumber of 1350 cm$^{-1}$ to 1450 cm$^{-1}$, and the infrared absorption peak has a transmittance of 90%-98%; or
   the negative active material has a volume particle size distribution $D_v50$ that satisfies 3 μm≤$D_v50$≤10 μm; or
   the negative active material has an X-ray diffraction pattern comprising a diffraction peak at a diffraction angle 2θ of 19° to 27° and the diffraction peak has a full width at half maxima of 4° to 12°.

3. The negative active material according to claim 1, wherein the negative active material has a compaction density of 1.1 g/cm$^3$-1.7 g/cm$^3$ under the test condition of 5 tonnes (equivalent to 49KN).

4. A preparation process of a negative active material, comprising:
   a) providing a core material comprising silicon-based materials;
   b) dispersing a polymer into a solvent to obtain a first slurry, in which the polymer is selected from one or more of polyacrylonitrile and polyacrylamide;
   c) adding the core material into the first slurry, and mixing it homogeneously to obtain a second slurry;
   d) drying the second slurry at 50° C.-200° C. to remove the solvent to obtain a polymer coated core material;
   e) subjecting the polymer coated core material to a heat treatment to carbonize the polymer, thereby obtaining the negative active material in which heat treatment is carried out at a temperature of 350° C.-450° C. for 2-3 hours;
   wherein the negative active material comprises the core material and a modified polymer coating layer coated on at least a part of the outer surface of the core material, the modified polymer coating layer comprises carbon element and nitrogen element, wherein the nitrogen element is present in the negative active material in a mass percentage of 0.2%-0.56% based on a total mass of the negative active material, the carbon element is present in a mass percentage of 1.7%-3.40% based on the total mass of the negative active material, and the modified polymer coating layer comprises a —C=N-linkage;
   wherein the negative active material has a number particle size distribution $D_n10$ that satisfies 2 μm≤$D_n10$≤4 μm, and
   wherein the negative active material has a Raman spectrum comprising scattering peaks at Raman shifts of 1320 cm$^{-1}$-1410 cm$^{-1}$ and 1550 cm-1-1650 cm-1 in which the scattering peak at the Raman shifts of 1320 cm$^{-1}$-1410 cm$^{-1}$ has a peak intensity recorded as $I_D$, and the scattering peak at the Raman shifts of 1550 cm$^{-1}$-1650 cm$^{-1}$ as a peak intensity recorded as $I_G$, and the peak intensity $I_D$ and the peak intensity $I_G$ satisfy 1.50≤$I_D/I_G$≤2.50; and
   wherein the negative active material has a specific surface area of 1.2 m$^2$/g-3 m$^2$/g.

5. The preparation process according to claim 4, wherein in step b), the polymer is added in an amount of less than or equal to 10% by mass based on a mass of the solvent.

6. The preparation process according to claim 4, wherein in the step c), the polymer is contained in the first slurry in a mass percentage of 1%-5% based on a mass of the core material.

7. The preparation process according to claim 4, wherein in the step c), the second slurry has a solid content of 20% or less.

8. The preparation process according to claim 4, wherein in the step b), the first slurry also comprises a conductive material.

9. A secondary battery comprising the negative active material according to claim 1.

10. A battery module, comprising the secondary battery according to claim 9.

11. A battery pack comprising the battery module according to claim 10.

12. A device comprising at least one of the secondary battery according to claim 9.

13. The negative active material according to claim 1, wherein the carbon element is present in a mass percentage of 1.7%-2.57% based on the total mass of the negative active material.

14. The negative active material according to claim 1, wherein the negative active material has a Raman spectrum comprising scattering peaks at Raman shifts of 1320 $cm^{-1}$-1410 $cm^{-1}$ and 1550 cm-1-1650 cm-1 in which the scattering peak at the Raman shifts of 1320 $cm^{-1}$-1410 $cm^{-1}$ as a peak intensity recorded as $I_D$, and the scattering peak at the Raman shifts of 1550 $cm^{-1}$-1650 $cm^{-1}$ as a peak intensity recorded as $I_G$, and the peak intensity $I_D$ and the peak intensity $I_G$ satisfy $1.80 \leq I_D/I_G \leq 2.40$.

15. The negative active material according to claim 1, wherein the negative active material has a specific surface area of 1.2 $m^2/g$-2.2 $m^2/g$.

16. The negative active material according to claim 1, wherein the negative active material has a volume particle size distribution $D_v50$ that satisfies $4\ \mu m \leq D_v50 \leq 8\ \mu m$.

* * * * *